(12) United States Patent
Shen et al.

(10) Patent No.: US 11,042,791 B2
(45) Date of Patent: Jun. 22, 2021

(54) METHOD AND APPARATUS FOR GENERATING AND READING COMPOSITE TWO-DIMENSIONAL CODE

(71) Applicants: Beijing Bigcode Technology Co., LTD., Beijing (CN); Beijing Sigone Investment Co., Ltd., Beijing (CN)

(72) Inventors: Wei Shen, Beijing (CN); Siping Wang, Beijing (CN)

(73) Assignee: BEIJING BIGCODE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/479,911

(22) PCT Filed: Jan. 23, 2018

(86) PCT No.: PCT/CN2018/073752
§ 371 (c)(1),
(2) Date: Jul. 22, 2019

(87) PCT Pub. No.: WO2018/137602
PCT Pub. Date: Aug. 2, 2018

(65) Prior Publication Data
US 2019/0370620 A1    Dec. 5, 2019

(30) Foreign Application Priority Data

Jan. 24, 2017   (CN) .......................... 201710052468.9

(51) Int. Cl.
*G06K 19/06*   (2006.01)
(52) U.S. Cl.
CPC . *G06K 19/06075* (2013.01); *G06K 19/06037* (2013.01); *G06K 19/06178* (2013.01)

(58) Field of Classification Search
CPC ....... G06K 19/06075; G06K 19/06037; G06K 19/06178
See application file for complete search history.

(56) References Cited

U.S. PATENT DOCUMENTS

2009/0255992 A1* 10/2009 Shen ....................... G06T 11/60
                                                              235/462.1
2016/0267370 A1*  9/2016 Nishizaki ......... G06K 19/06037
2017/0103293 A1*  4/2017 Pic ................... G06K 19/06037

FOREIGN PATENT DOCUMENTS

| CN | 104899630 | 9/2015 |
| CN | 105224974 | 1/2016 |
| CN | 105825257 | 8/2016 |

OTHER PUBLICATIONS

English Translation of International Search Report for International application No. PCT/CN2018/073752, dated Apr. 28, 2018.

(Continued)

*Primary Examiner* — Laura A Gudorf
(74) *Attorney, Agent, or Firm* — Hoffman Warnick LLC; Franklin S. Abrams (57) ABSTRACT

Disclosed is an apparatus for generating a composite two-dimensional code, comprising: a two-dimensional code encoding module 1, a two-dimensional code pattern generating module 2, a hidden information encoding module 3, a hidden information pattern generating module 4, a recoding region setting module 5, an pattern compositing module 6, and an output module 7. The two-dimensional code encoding module 1 converts the inputted two-dimensional code information into a binary codeword sequence to generate two-dimensional code coding information; the two-dimensional code pattern generating module 2 generates a two-dimensional code pattern based on the two-dimensional code coding information; the hidden information encoding module 3 converts the hidden information into a binary (Continued)

codeword sequence to generate recoding information; the recoding region setting module 5 sets, in the two-dimensional code pattern, a recoding region for encoding the hidden information; the hidden information pattern generating module 4 generates a hidden information coding pattern formed by dark-colored blocks and light-colored blocks based on the recoding information; and the pattern composing module 6 adjusts a block distribution in the recoding region of the two-dimensional code pattern based on the hidden information coding pattern so as to encode the hidden information.

13 Claims, 9 Drawing Sheets

(56) References Cited

OTHER PUBLICATIONS

English Translation of Written Opinion for International application No. CN2018/073752, dated May 2, 2018.
English translation of relevant portions of CN105825257 Publication Date of CN105825257: Aug. 3, 2016 (Aug. 3, 2016).
English translation of relevant portions of CN104899630 Publication Date of CN104899630: Sep. 9, 2015 (Sep. 9, 2015).
English translation of relevant portions of CN105224974 Publication Date of CN105224974: Jan. 6, 2016 (Jan. 6, 2016).

\* cited by examiner

METHOD AND APPARATUS FOR GENERATING AND READING COMPOSITE TWO-DIMENSIONAL CODE

CROSS-REFERENCE TO RELATED APPLICATIONS

This application is a national phase filing under 35 U.S.C. § 371 of PCT International Application PCT/CN2018/073752, filed Jan. 23, 2018, and published under PCT Article 21(2) in Chinese as WO/2018/137602 on Aug. 2, 2018. PCT/CN2018/073752 claimed priority benefit of China Patent Application No. 201710052468.9 filed Jan. 24, 2017. The above identified applications are hereby incorporated by reference in their entirety.

FIELD

Embodiments of the present disclosure relate to a method and an apparatus for generating a composite two-dimensional code and a method and an apparatus for reading the same, and more particularly relate to a technology of coding multiple groups of information into a two-dimensional code so as to enhance security of the two-dimensional code.

BACKGROUND

Two-dimensional codes have been applied extensively. Now, applications such as Internet access and payment by code scanning with a mobile phone have become popular. As coding and decoding of two-dimensional codes have become known technologies, any one may generate a two-dimensional code via two-dimensional code generating software or a website, which poses a great challenge for the security of Internet access and payment by code scanning. Therefore, how to enhance security of two-dimensional codes is an urgent issue to address in the current two-dimensional code field.

Literature 1 (Publication No. CN102184380A) discloses a two-dimensional code superimposed with color information. Its technical idea is to overlay a colored coating on a typical two-dimensional code, where the colored coating is combined by different colored blocks to thereby constitute hidden information. The hidden information is encrypted and can only be decrypted by a key. The two-dimensional code is read synchronous with the hidden information. By decrypting the hidden information, authenticity of the two-dimensional code is verified.

Literature 2 (Publication No. CN102902997A) discloses a hybrid encoded two-dimensional code. In that patent, part of original information of the two-dimensional code is encrypted into hidden information, decryption of which needs a key. Upon reading such a two-dimensional code, the hidden information is decrypted with the key to thereby obtain full information.

Literature 3 (Publication No. CN104392260A) discloses a two-dimensional code anti-counterfeiting method based on additional information. Its technical idea is to add a group of dense points in a standard two-dimensional code, wherein changing the color of part of blocks of the standard two-dimensional code causes change of the pattern of the two-dimensional code, thereby generating a two-dimensional code pattern different from the standard two-dimensional code. The pattern of the standard two-dimensional code and the positions of dense points are stored in the server, and the authenticity of the two-dimensional code is determined by confirming the positions of the dense points.

All of the conventional methods above are based on the existing two-dimensional code, then a group of data or dense points are additionally provided to verify the two-dimensional code information so as to achieve the objective of anti-counterfeiting. However, as the additionally provided data and the dense points are easily read and recognized, a problem still exists that the two-dimensional code is easily copied.

For example, in Literature 1, although the colored hidden information is encrypted, the same colored coating may be copied using a bit stream as read out, as long as the coding rule is cracked, without a need to decrypt the information per se. Due to the visibility of colored coating, the coding rule may be easily cracked by analyzing the colored coating. Meanwhile, addition of the colored coating increases much the cost of producing the two-dimensional code.

With Literature 2 as an example, although part of information in the two-dimensional code is encrypted, a completely identical two-dimensional code may be simply copied using an existing two-dimensional code generating tool based on the bit stream read out. Meanwhile the two-dimensional code has an overlay layer on which an encrypted symbol is printed, which increases production complexity.

In Literature 3, the dense points only have position information. As the dense points per se do not carry information, the information per se of the two-dimensional code does not change; after copying the two-dimensional code using the read information, the positions of the dense points may be determined by comparing the original two-dimensional code pattern and the copied two-dimensional code pattern, and then by configuring the dense points, a completely identical two-dimensional code may be copied out. Further, because the dense points only have position information, once the dense points are stained, the authenticity of the two-dimensional code cannot be determined, which provides a poor reliability.

Moreover, the two-dimensional codes are also extensively applied to logistic tracking and management. Two-dimensional codes may also be used by enterprises in marketing. Consequently, pluralities of two-dimensional codes with different purposes are usually printed on one object or package, which not only causes users to be easily confused, but also waste paper and printing ink.

SUMMARY

An objective of the present disclosure is to provide a method and an apparatus for generating a composite two-dimensional code and a method and apparatus for reading the same, wherein multiple groups of information may be encoded into the composite two-dimensional code, causing it difficult to be copied, thereby addressing the above problems in the prior art.

A first technical solution of the present disclosure provides an apparatus for generating a composite two-dimensional code, comprising: a two-dimensional code encoding module (1), a two-dimensional code pattern generating module (2), a hidden information encoding module (3), a recoding region setting module (5), an pattern compositing module (6), and an output module (7);

the two-dimensional code encoding module (1) is configured for generating two-dimensional code coding information based on two-dimensional code information;

the two-dimensional code pattern generating module (2) is configured for generating a two-dimensional code pattern based on the two-dimensional code coding information;

the hidden information encoding module (3) is configured for generating recoding information based on hidden information;

the recoding region setting module (5) is configured for setting a recoding region for encoding the hidden information in the two-dimensional code pattern; and the pattern compositing module (6) is configured for adjusting a block distribution of the recoding region (Q) in the two-dimensional code pattern (W) to encode the hidden information into the two-dimensional code pattern, thereby generating the composite two-dimensional code.

A second technical solution is based on the first technical solution, further comprising: an output module (7) configured for verifying, before outputting the composite two-dimensional code, whether a bit error rate of the two-dimensional code is lower than an error correction rate or there remains an error correction margin.

A third technical solution is based on the second technical solution, further comprising: a mask processing module (8) configured for performing, after the pattern compositing module (6) encodes the hidden information into the two-dimensional code pattern, mask processing to the two-dimensional code pattern encoded with the hidden information, to thereby generate the composite two-dimensional code.

A fourth technical solution is based on the third technical solution, wherein the hidden information encoding module (3) adds an error correction codeword when generating recoding information such that the hidden information has an error correction function.

A fifth technical solution is based on the fourth technical solution, wherein the recoding region setting module (5) sets a plurality of recoding regions.

A sixth technical solution is based on the fifth technical solution, wherein when generating the two-dimensional code coding information, the two-dimensional code encoding module (1) combines the two-dimensional code information with setting information of the recoding region into combined information, and then generates the two-dimensional code coding information based on the combined information.

A seventh technical solution is based on any one of the first through sixth technical solutions, further comprising: a hidden information pattern generating module (4) which is configured for generating a hidden information coding pattern based on a shape of the recoding region and the number of blocks included in the recoding region, wherein the block distribution in the hidden information coding pattern corresponds to the recoding information.

An eighth technical solution provides a method for generating a composite two-dimensional code, comprising steps of:

Step 1 (S2): generating two-dimensional code coding information based on two-dimensional code information;

Step 2 (S3): generating a two-dimensional code pattern (W) based on the two-dimensional code coding information;

Step 3 (S4): setting a recoding region (Q) in the generated two-dimensional code pattern (W);

Step 4 (S5): generating recoding information based on hidden information;

Step 5 (S6): generating a hidden information coding pattern based on a shape of the recoding region (Q) and blocks included in the recoding region (Q), such that a block distribution in the hidden information coding pattern corresponds to the recoding information;

Step 6 (S7): transposing a distribution of dark-colored blocks and light-colored blocks in the recoding region (Q) into the distribution identical to the hidden information coding pattern based on the hidden information coding pattern so as to encode the hidden information into the two-dimensional code, thereby generating the composite two-dimensional code.

A ninth technical solution is based on the eighth technical solution, further comprising: step 7 (S8): verifying whether a bit error rate of the composite two-dimensional code is lower than an error correction rate; if the bit error rate is greater than the error correction rate, resetting an error correction level of the two-dimensional code or repositioning the recoding region (Q).

A tenth technical solution is based on the ninth technical solution, further comprising:

substituting step 6a for the step 5 (S6) and the step 6 (S7), wherein in the step 6a, code elements in the recoding information are sequentially read and compared with numerical values of corresponding blocks in the recoding region; performing anti-color processing to an inconsistent block; and encoding the hidden information into the two-dimensional code to thereby generate the composite two-dimensional code.

An eleventh technical solution is based on the tenth technical solution, wherein:

in the step 4 (S5), when generating the recoding information, an error correction codeword is added, such that the hidden information has an error correction function.

A twelfth technical solution is based on the eleventh technical solution, wherein in Step 3 (S4), a plurality of recoding regions (Q) are set in the generated two-dimensional code pattern (W).

A thirteenth technical solution is based on any one of the eighth technical solution through the twelfth technical solution, wherein in the step 1 (S2), when generating the two-dimensional code coding information, the two-dimensional code information is combined with setting information of the recoding region into combined information, and then the two-dimensional code coding information is generated based on the combined information.

A fourteenth technical solution provides an apparatus for reading a composite two-dimensional code, comprising: a two-dimensional code pattern obtaining module (11), a two-dimensional code decoding module (12), a recoding region determining module (13), and a hidden information decoding module (14); wherein the composite two-dimensional code includes two-dimensional code information and hidden information, the hidden information being encoded in a two-dimensional code pattern by recoding part of blocks of the two-dimensional code;

the two-dimensional code pattern obtaining module (11) is configured for obtaining an pattern of the composite two-dimensional code;

the two-dimensional code decoding module (12) is configured for decoding the obtained pattern of the composite two-dimensional code to obtain two-dimensional code information;

the recoding region determining module (13) is configured for determining a position of the recoding region in the composite two-dimensional code pattern based on a preset setting; and the hidden information decoding module (14) is configured for decoding the recoding region to obtain the hidden information.

A fifteenth technical solution is based on the fourteenth technical solution, wherein:

the two-dimensional code information of the composite two-dimensional code includes setting information for setting the recoding region; and the recoding region determining module (13) is configured for determining a position of the recoding region in the composite two-dimensional code pattern based on the setting information encoded into the two-dimensional code information.

A sixteenth technical solution provides a method for reading a composite two-dimensional code, the composite two-dimensional code including two-dimensional code information and hidden information, the hidden information being encoded in a two-dimensional code pattern by recoding part of blocks of the two-dimensional code, the method comprising steps of:

Step 1 (S20): obtaining an pattern of the composite two-dimensional code;

Step 2 (S30): decoding the composite two-dimensional code to obtain two-dimensional code information;

Step 3 (S40): determining a recoding region (Q) in the composite two-dimensional code pattern based on the preset setting information; and step 4 (S50): decoding the recoding region (Q) to obtain the hidden information.

A seventeenth technical solution is based on the sixteenth technical solution, wherein:

the two-dimensional code information of the composite two-dimensional code includes setting information for setting the recoding region; and in the Step 3 (S40): the setting information is obtained based on the decoded two-dimensional code information, and the recoding region (Q) in the composite two-dimensional code pattern is determined based on the setting information.

The present disclosure offers the following effects:

As one or more recoding regions (Q) are set in the two-dimensional code pattern (W), the blocks in the recoding region (Q) are recoded with hidden information. The size of the recoding region (Q) is set based on the error correction capability of the two-dimensional code, such that the encoded hidden information does not affect decoding of the two-dimensional code. Therefore, the two-dimensional code information encoded into the two-dimensional code may be read by any two-dimensional code reading apparatus, such that the universality of the two-dimensional code information encoded into the two-dimensional code is not affected. By positioning and decoding the recoding region in the two-dimensional code, the hidden information may be read. As the two-dimensional code does not change in appearance, the hidden information therein cannot be hijacked. When reading the two-dimensional code for copying, as the bit stream does not include the hidden information, the composite two-dimensional code cannot be copied, which thus enhances security of the two-dimensional code. As two and more groups of information can be encoded in a two-dimensional code pattern, the two-dimensional code information may be public information, e.g., a network address, which may be decoded by a universal code scanning software to implement a relevant operation; the hidden information can only be recognized and decoded using a specific code scanning software with a function of positioning the recoding region, such that the hidden information may be utilized for managing generation of the two-dimensional code, which further enhances security of the two-dimensional code. Additionally, one code may be utilized for two purposes: for example, by encoding the network address information in the two-dimensional code with the hidden information as logistic information, the user interface will be uniform, and the cost may be saved in the meanwhile.

DETAILED DESCRIPTION OF EMBODIMENTS

Hereinafter, embodiments of the present disclosure will be illustrated. In the following embodiments, only preferred implementation manners and embodiments are exemplarily illustrated, which should not be construed as limitations to the scope of the present disclosure.

First, the technical idea of the present disclosure will be explained.

A two-dimensional code, e.g., a QR code, has an error correction function, which means within the scope of error correction capability, decoding of the two-dimensional code will not be affected even part of the the two-dimensional code pattern is missed or damaged. The present disclosure leverages the error correction function of the two-dimensional code, wherein a recoding region is set within the two-dimensional code, the blocks in the region are recoded based on a preset rule, i.e., encoding the hidden information in the two-dimensional code by redistributing the light-colored and dark-colored blocks, such that one two-dimensional code pattern has both two-dimensional code information and hidden information. Based on the number of recoding regions, multiple groups of hidden information may be provided for coding. The size and position of the recoding region are set based on an error correction level of the two-dimensional code; the overall bit error rate of the two-dimensional code is maintained lower than the error correction rate of the two-dimensional code, such that recoding of blocks does not affect decoding of the two-dimensional code information.

When decoding the two-dimensional code, the hidden information in the recoding region will not be decoded, i.e., for a two-dimensional code decoding device, the hidden information is concealed, and the hidden information per se may be any information. For example, the hidden information may be verification information for verifying the authenticity of the two-dimensional code information, or management information or logistic information of an item.

Upon reading, the recoding region is positioned based on a positioning pattern of the two-dimensional code, and by decoding the recoding region, the hidden information may be obtained.

As the hidden information is implemented by adjusting distribution of part of blocks of the two-dimensional code, the sizes and shapes of blocks in the recoding region do not change, and the two-dimensional code does not change in the appearance, such that it cannot be determined from the appearance that the two-dimensional code has combined multiple groups of information. When decoding the two-dimensional code, as the hidden information will not be decoded, it is impossible to copy out an identical two-dimensional code using the decoded information. Namely, besides offering the two-dimensional code with multiple groups of information, the hidden information encoded in the two-dimensional code essentially plays a role of a digital watermark, which overcomes the easy-copying deficiency of a conventional two-dimensional code, and thus improves security of the two-dimensional code. The two-dimensional code herein is not limited to the QR code. Any pattern code formed by blocks and having an error correction function is suitable for the present disclosure.

Hereinafter, embodiments of the present disclosure will be illustrated.

Figure 1:
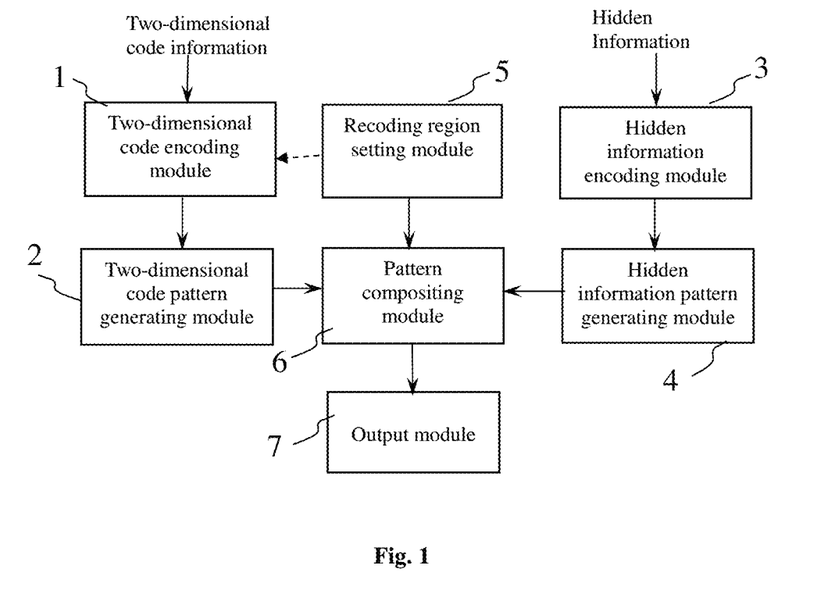
FIG. 1 is a structural block diagram of an apparatus for generating a composite two-dimensional code according to the present disclosure.

FIG. 1 is a structural block diagram of an apparatus for generating a composite two-dimensional code according to the present disclosure.

As shown in FIG. 1, the apparatus for generating a composite two-dimensional code comprises a two-dimensional code encoding module 1, a two-dimensional code pattern generating module 2, a hidden information encoding module 3, a hidden information pattern generating module 4, a recoding region setting module 5, an pattern compositing module 6, and an output module 7.

The two-dimensional code encoding module 1 is connected to the two-dimensional code pattern generating module 2; the hidden information encoding module 3 is connected to the hidden information pattern generating module 4; the two-dimensional code pattern generating module 2, the hidden information pattern generating module 4, and the recoding region setting module 5 are connected to the pattern compositing module 6; and the pattern compositing module 6 is connected to the output module 7.

The two-dimensional code encoding module 1 is configured for converting inputted two-dimensional code information into a binary codeword sequence and adding an error correction codeword into the codeword sequence to generate two-dimensional code coding information. An error correction level of the two-dimensional code is manually set or automatically set based on an amount of information in the encoded hidden information. The generated two-dimensional code coding information is inputted into the two-dimensional code pattern generating module 2.

The two-dimensional code pattern generating module 2 generates a two-dimensional code pattern based on the two-dimensional code coding information and a version of the two-dimensional code. The version of the two-dimensional code is manually set or automatically set based on the amount of information in the two-dimensional code coding information. The two-dimensional code pattern is inputted to the pattern composing module 6.

The hidden information encoding module 3 is configured for converting the hidden information into a binary codeword sequence to generate recoding information. The recoding information is inputted into the hidden information pattern generating module 4. In this embodiment, by adding an error correction codeword in the codeword sequence, the hidden information has an error correction function. The error correction level is identical to the error correction level of the two-dimensional code. The error correction function is not essential, which may be selected according to needs. The error correction level of the hidden information may also select an error correction level different from that of the two-dimensional code.

The recoding region setting module 5 is configured for setting, in the two-dimensional code pattern, a recoding region for encoding the hidden information so as to generate setting information associated with a shape of the recoding region, the number of blocks in the region, and a reference position. The setting information is inputted to the pattern composing module 6.

Figure 2:
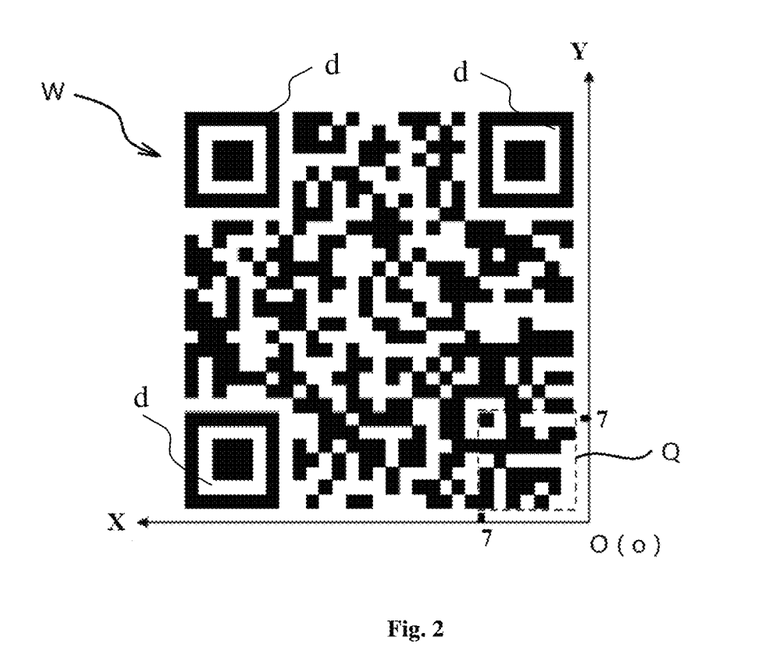
FIG. 2 is a diagram illustrating setting of a recoding region.

FIG. 2 is a diagram illustrating setting of a recoding region.

As shown in FIG. 2, the lower right corner of the two-dimensional code W is the coordinate origin O and the reference point o of the recoding region Q is located at the position of the coordinate origin O. The recoding region Q is a square shape, including 7*7 blocks. The positions of the recoding region Q and the respective blocks in the region in the two-dimensional code W may be determined based on the three positioning patterns d of the two-dimensional code W and the number of blocks on X axis and Y axis.

The hidden information pattern generating module 4 generates a hidden information coding pattern formed by dark-colored blocks and light-colored blocks based on the recoding information. In this embodiment, the shape of the hidden information coding pattern and the number of blocks included therein are identical to the recoding region, while their sizes may be different. The hidden information coding pattern is inputted to the pattern composing module 6.

The pattern composing module 6 determines the recoding region Q in the two-dimensional code pattern W based on the setting information, adjusts the block distribution in the recoding region Q based on the hidden information coding pattern, and encodes the hidden information into the recoding region Q, wherein the two-dimensional code encoded with the hidden information serves as the composite two-dimensional code to be inputted to the output module.

Figure 3:
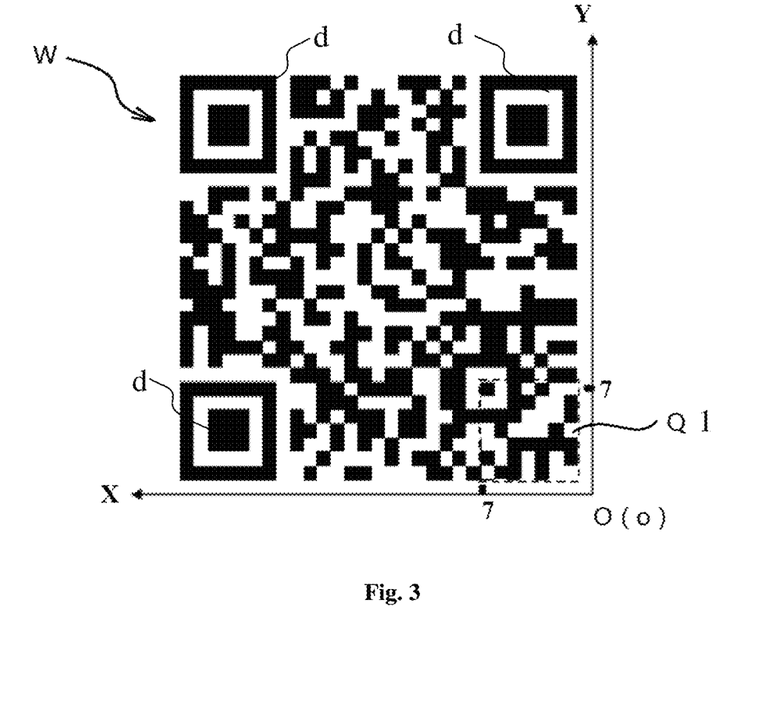
FIG. 3 is a code pattern after the hidden information is encoded in the recoding region.

FIG. 3 is a code pattern after the recoding region encoded with the hidden information. Compared with FIG. 2, except the block distribution in the recoding region Q1, nothing changes in the FIG. 3.

The output module 7 is configured for outputting the composite two-dimensional code. Before output, whether the two-dimensional code may be decoded or whether there still has an error correction margin is verified to ensure that the two-dimensional code can be decoded or has an error correction margin. The verification method may be performed by using a two-dimensional code reading device to practically decode the composite two-dimensional code. In the case of failing to decode, it illustrates that the bit error rate of the overall two-dimensional code is greater than the error correction rate, such that it needs to raise the error correction level or adjust the size and position of the recoding region, causing the bit error rate of the overall two-dimensional code to be lower than the error correction rate. The output module 7 inputs the decoded and verified composite two-dimensional code for storage and printing, etc.

Hereinafter, illustration will be made to the method of generating a composite two-dimensional code using the apparatus for generating a composite two-dimensional code of FIG. 1.

Figure 4:
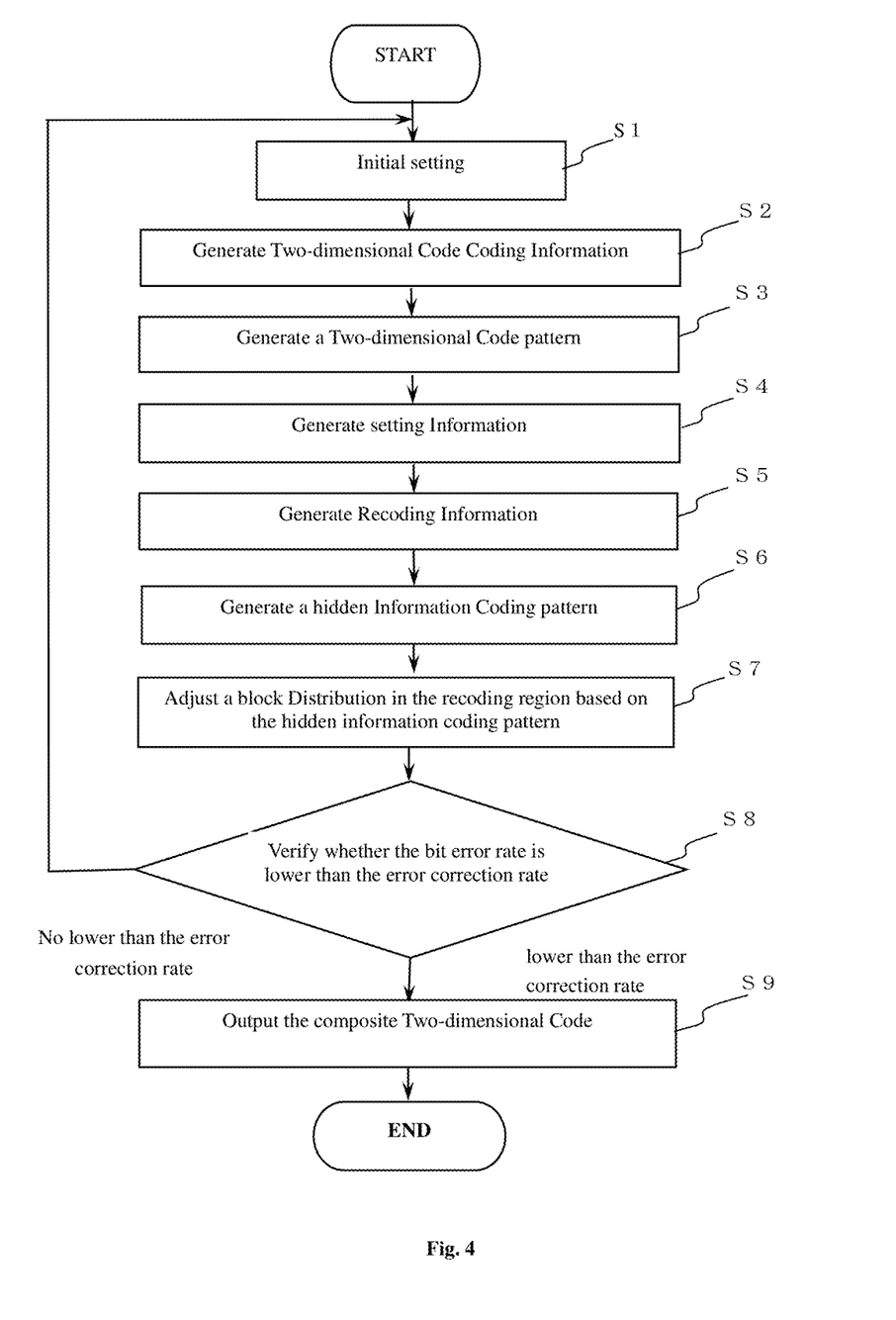
FIG. 4 is a flowchart of a method for generating a composite two-dimensional code.

FIG. 4 is a flowchart of generating a composite two-dimensional code.

Step S1: initial setting. The initial setting includes the following settings: setting an error correction level of the two-dimensional code; and setting a two-dimensional code version and inputting setting information, wherein the setting information includes a shape of the recoding region Q, the number of blocks included, and the position of the reference point o of the recoding region Q (see FIGS. 2 and 3).

Step S2: generating, by the two-dimensional coding module 1, two-dimensional code coding information based on two-dimensional code information and the error correction level.

Step S3: generating, by the two-dimensional code pattern generating module 2, a two-dimensional code pattern based on the two-dimensional code coding information and the two-dimensional code version.

Step S4: generating, by the recoding region setting module 5, setting information including a shape of the recoding region Q, the number of blocks included therein, and position coordinates o of the recoding region. The recoding region Q is preferably set in the data region as shown in FIG. 2. For a QR code, the recoding region may be set at any position in the two-dimensional code as long as it may avoid the positioning pattern d.

Step S5: converting, by the hidden information encoding module 3, the hidden information into a binary codeword sequence, and adding an error correction codeword into the codeword sequence based on the set error correction level to generate recoding information.

Step S6: generating, by the hidden information pattern generating module 4, a hidden information coding pattern formed by dark-colored blocks and light-colored blocks based on the recoding information, wherein the hidden information coding pattern has a shape identical to the recoding region Q.

Step S7: transposing, by the pattern composing module 6, a distribution of dark-colored blocks and light-colored blocks in the recoding region Q into the distribution identical to the hidden information coding pattern based on the hidden information coding pattern so as to encode the hidden information into the two-dimensional code.

Step S8: verifying, by the output module 7, the two-dimensional code encoded with the hidden information to verify whether its overall bit error rate is lower than an error correction rate; wherein if the bit error rate is lower than the error correction rate, the two-dimensional code encoded with the hidden information is outputted as the composite two-dimensional code in step S8 for saving, transfer, or printing. If the bit error rate is greater than the error correction rate, the flow returns to step S1 to reset the error correction level of the two-dimensional code; if the setting information may be adjusted, the position or shape of the recoding region Q may also be adjusted till the overall bit error rate of the composite two-dimensional code is lower than the error correction rate.

Hereinafter, an apparatus for reading a composite two-dimensional code according to the present disclosure will be illustrated.

Figure 5:
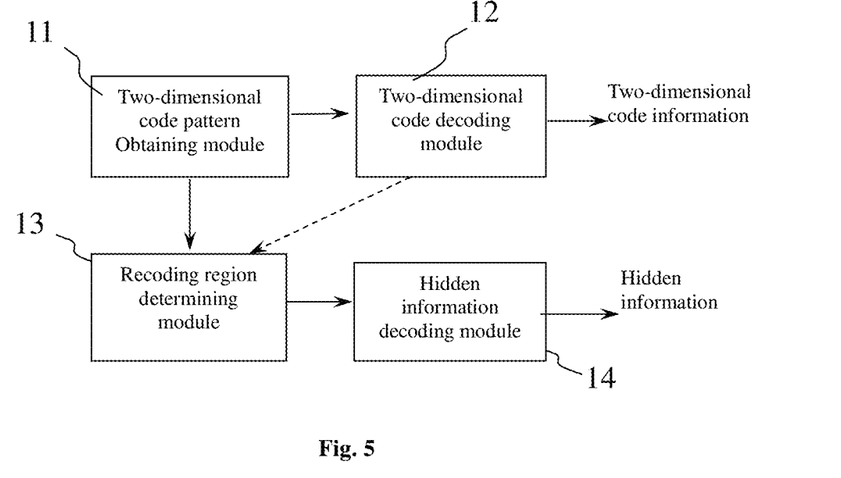
FIG. 5 is a structural block diagram of an apparatus for reading a composite two-dimensional code according to the present disclosure.

FIG. 5 is a structural block diagram of the apparatus for reading a composite two-dimensional code according to the present disclosure.

As shown in FIG. 5, the apparatus for reading a composite two-dimensional code according to the present disclosure comprises: a two-dimensional code pattern obtaining module 11, a two-dimensional code decoding module 12, a recoding region determining module 13, and a hidden information decoding module 14.

The two-dimensional code pattern obtaining module 11 is connected to the two-dimensional code decoding module 12 and the recoding region determining module 13; and the recoding region determining module 13 is connected to the hidden information decoding module 14.

The two-dimensional code pattern obtaining module 11 is configured for obtaining an pattern of the composite two-dimensional code, where the pattern may be obtained by an optical method or a non-optical electronic method. The obtained composite two-dimensional code pattern is inputted into the two-dimensional code decoding module 12 and the recoding region determining module 13.

The two-dimensional code decoding module 12 decodes the overall composite two-dimensional code as an object to obtain two-dimensional code information. Upon decoding, information of the blocks, including the blocks in the recoding region Q, which causes a bit error, is automatically corrected via the error correction codeword, such that information loss or code error will not occur.

The recoding region determining module 13, as shown in FIG. 2, determines the coordinate origin O based on the three positioning patterns d of the two-dimensional code W, and with the origin O as the reference, determines the recoding region Q using the same setting information as that when the recoding region Q is set. Namely, the setting information for determining the recoding region Q is agreed in advance.

The hidden information decoding block 14 decodes the encoded blocks in the recoding region Q to obtain hidden information.

Hereinafter, illustration will be made to the method of reading a composite two-dimensional code using the reading apparatus of FIG. 5.

Figure 6:
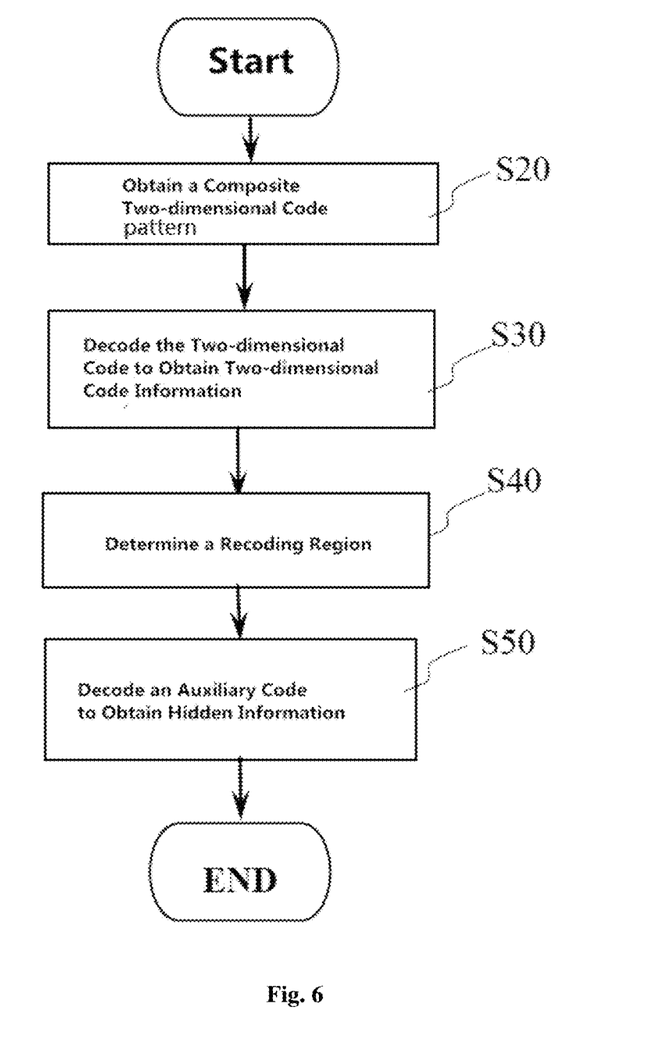
FIG. 6 is a flowchart of reading a composite two-dimensional code.

FIG. 6 is a flowchart of reading a composite two-dimensional code.

Step S20: obtaining, by the two-dimensional code pattern obtaining module 11, an pattern of the composite two-dimensional code, wherein the pattern is inputted into the two-dimensional code decoding module 12 and the recoding region determining module 13.

Step S30: decoding, by the two-dimensional code decoding module 12, the overall composite two-dimensional code as an object to obtain the two-dimensional code information. All the information of the blocks, including the information of the blocks in the recoding region, which causes a bit error, is automatically corrected via the error correction codeword, such that information loss or code error will not occur.

Step S40: determining, by the recoding region determining module 13, the recoding region Q in the pattern of the composite two-dimensional code.

Step S50: decoding, by the hidden information decoding module 14, a block distribution in the recoding region Q to obtain hidden information.

What have been illustrated above are the apparatus for generating a composite two-dimensional code, the apparatus for reading a composite two-dimensional code, and the generation (of the composite two-dimensional code). Because the hidden information is implemented by adjusting distribution of part of blocks of the two-dimensional code, the overall two-dimensional code does not have any shape change in the appearance. As a universal two-dimensional code decoding device can only obtain the two-dimensional code information, copying with the decoded information can only obtain the two-dimensional code without hidden information; in other words, the hidden information plays a role of digital watermark, which solves the problem that the conventional two-dimensional codes are easily copied, thereby enhancing security of two-dimensional codes.

As multiple groups of information may be encoded in one two-dimensional code, anti-counterfeiting is enabled via the hidden information; besides, "one code, multiple purposes" is also enabled, which solves the problem that printing or sticking a plurality of two-dimensional codes on an item or package easily causes confusion; meanwhile, paper and printing ink costs are also solved.

Hereinafter, other varied examples will be illustrated.

Varied Example 1

In the illustrations above, the shape of the hidden information coding pattern is identical to the shape of the recoding region Q; the blocks in the hidden information coding pattern are in one-to-one correspondence with the blocks in the recoding region Q; based on the correspondence relationship, the block distribution in the recoding region Q is substituted with the distribution identical to the hidden information coding pattern.

In Varied Example 1, the hidden information is directly encoded into the recoding region of the two-dimensional code W using the bit stream of the recoding information.

Figure 7:
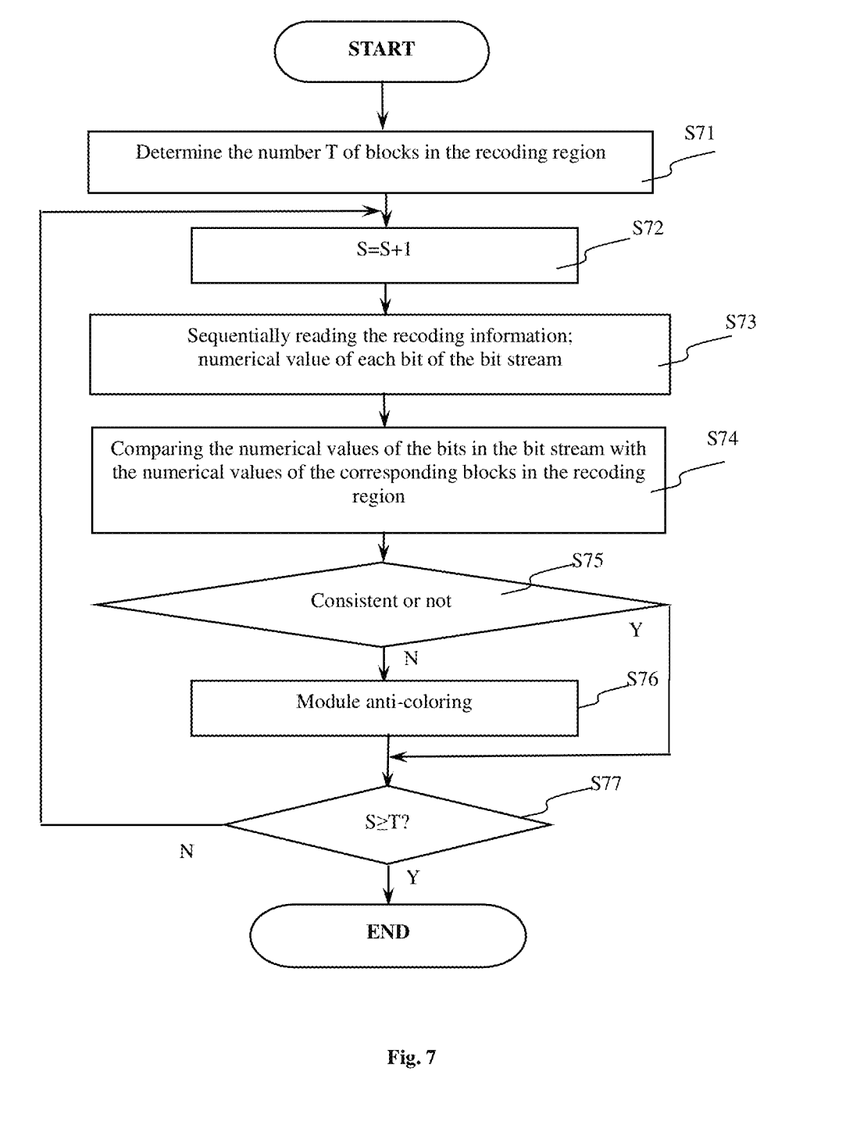
FIG. 7 is a flowchart of encoding hidden information in a two-dimensional code using a codeword sequence of the hidden information.

FIG. 7 is a flowchart of encoding hidden information into a two-dimensional code using a bit stream of recoding information.

Step S71: determining a total number T of the blocks in the recoding region Q;

Step S72: running a counter S=S+1, the initial value of S being 0;

Step S73: sequentially reading a numerical value of each bit of the bit stream of the recoding information;

Step S74: comparing the numerical values of the bits in the bit stream with the numerical values of the corresponding blocks in the recoding region Q, e.g., the numerical value of a dark-colored block is 1, while the numerical value of a light-colored block is 0.

Step S75: determining a comparison result; in the case of consistency, the flow goes to step S77; in the case of inconsistency, the flow goes to step S76 to perform an anti-color processing to the block, wherein the dark-colored block is adjusted to a light-colored block, or the light-colored block is adjusted to the dark-colored block.

Step S77: determining whether the count value S of the counter is greater than or equal to T; in the case of being less than T, the flow returns to step S72 to repeat the steps above till the count value S is greater than or equal to T, and the flow ends after comparison with each bit of the recoding information bit stream is completed.

In the varied example, the hidden information may still be encoded in the two-dimensional code without a need of setting the hidden information coding pattern based on the shape of the recoding region Q, which may eliminate the hidden information pattern generating module 4, thereby simplifying the structure.

Varied Example 2

In the illustrations above, the setting of the recoding region Q upon generation and the setting of the recoding region Q upon reading are separately set. To guarantee correct reading of the hidden information, the two regions must be identical and their positions, shapes, and the number of blocks included therein must be pre-agreed; a consequence is that the settings cannot be changed upon generation. The Varied Example 2 offers a technical solution that may change the settings of the recoding region Q.

In the apparatus for generating a composite two-dimensional code, the recoding region setting module 5 is connected to the two-dimensional coding module 1 (in FIG. 1, represented by a dotted line); when the recoding region setting module 5 is setting the recoding region Q, the setting information including the shape and position of the recoding region Q as well as the number of blocks included therein is inputted into the two-dimensional code encoding module 1; the two-dimensional code encoding module 1 combines the setting information with the two-dimensional code information into combined information, and then the two-dimensional code coding information is generated based on the combined information. The head and the tail of the setting information are flagged with special characteristics.

In the apparatus for reading the composite two-dimensional code, the two-dimensional code decoding module 12 is connected to the recoding region determining module 13 (in FIG. 5, represented by a dotted line), the setting information decoded by the two-dimensional decoding module 12 is inputted to the recoding region determining module 13, and then the recoding region determining module 13 sets the recoding region Q based on the setting information. Therefore, the recoding region Q can be still correctly set without agreeing in advance on an apparatus for reading the composite two-dimensional code.

When performing decoding, the two-dimensional code decoding module 12 determines the setting information by detecting the special characteristics and performs non-displaying processing.

In this varied example, because the shape and position of the recoding region Q and the number of blocks included therein may be arbitrarily set, various two-dimensional codes may have different recoding region positions or shapes, such that a decode attempt can hardly find the position of the recoding region Q, which enhances the difficulty of cracking the coding algorithm and further enhances security of the two-dimensional code.

Varied Example 3

Figure 8:
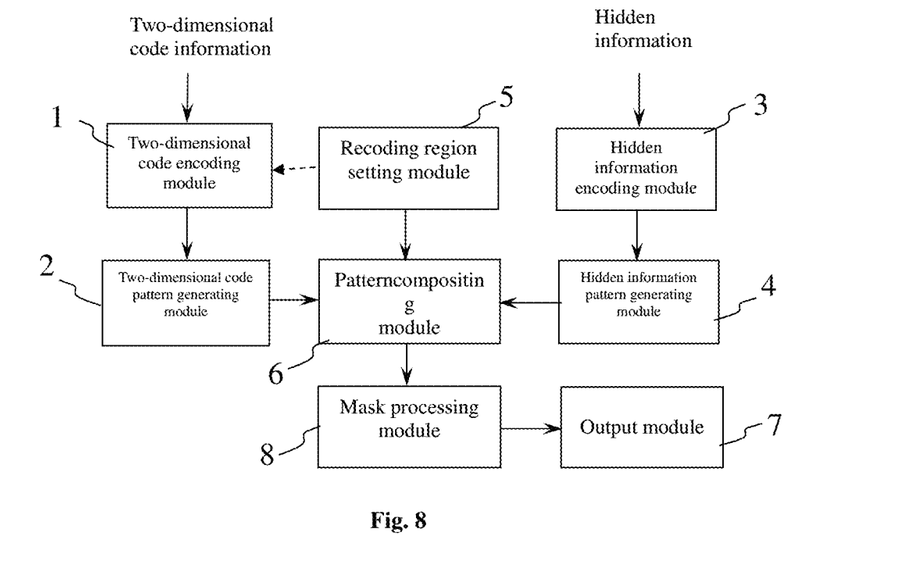
FIG. 8 is a varied embodiment of the apparatus for generating a composite two-dimensional code.

FIG. 8 is a varied embodiment of the apparatus for generating a composite two-dimensional code.

Different from the structure in FIG. 1, a mask processing module 8 is added in FIG. 8. An pattern composing module 6 is connected to an output module 7 via the mask processing module 8.

Mask processing may not be performed when the two-dimensional code pattern generating module 2 generates the two-dimensional code. After the pattern composing module 6 encodes the hidden information into the two-dimensional code W, the mask processing module 8 performs mask processing, and the recoding region is also subjected to mask processing, leading to uniform distribution of the dark-colored blocks and light-colored blocks, which not only improves the stain-proof capability of the hidden information, but also eliminates the trace of encoding the hidden information, which further enhances security of the two-dimensional code.

Varied Example 4

Figure 9:
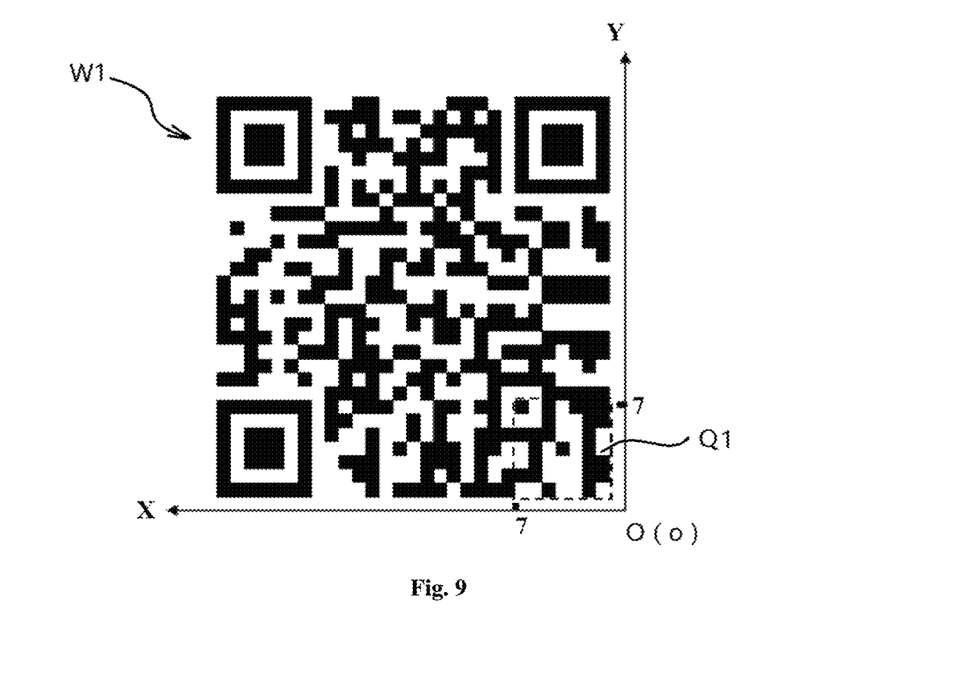
FIG. 9 is an example of performing secure payment using a composite two-dimensional code.
Figure 10:
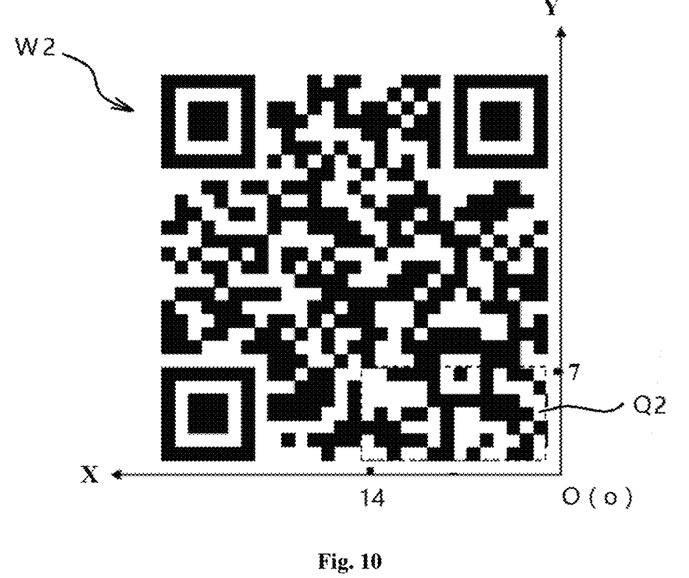
FIG. 10 is an example of monitoring an advertisement using a composite two-dimensional code.

FIG. 10 is a varied example of the recoding region. In FIGS. 2, 3, and 9, the recoding region is square; in the varied example of FIG. 10, the recoding region Q2 in the two-dimensional code W2 is a rectangular region including 7*14 blocks, where the reference position o coincides with the coordinate origin O.

Varied Example 5

Figure 11:
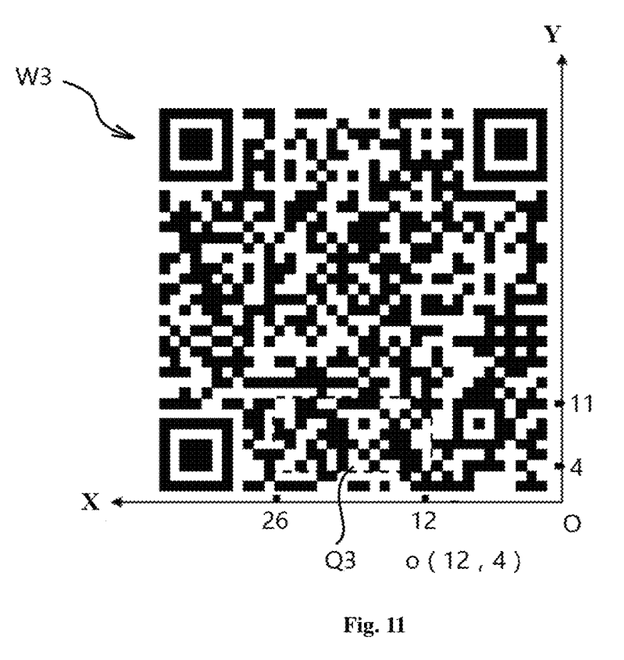
FIG. 11 is an example of applying the composite two-dimensional code to logistics plus marketing.

FIG. 11 is a varied example of the recoding region. In the two-dimensional code W3, the recoding region Q3 is identical to FIG. 11, i.e., a rectangular region including 7*14 blocks; but the difference from FIG. 11 lies in the position of the recoding region Q3, wherein the reference position o of the recoding region Q3 is at the coordinate (12, 4) position.

Varied Example 6

Figure 12:
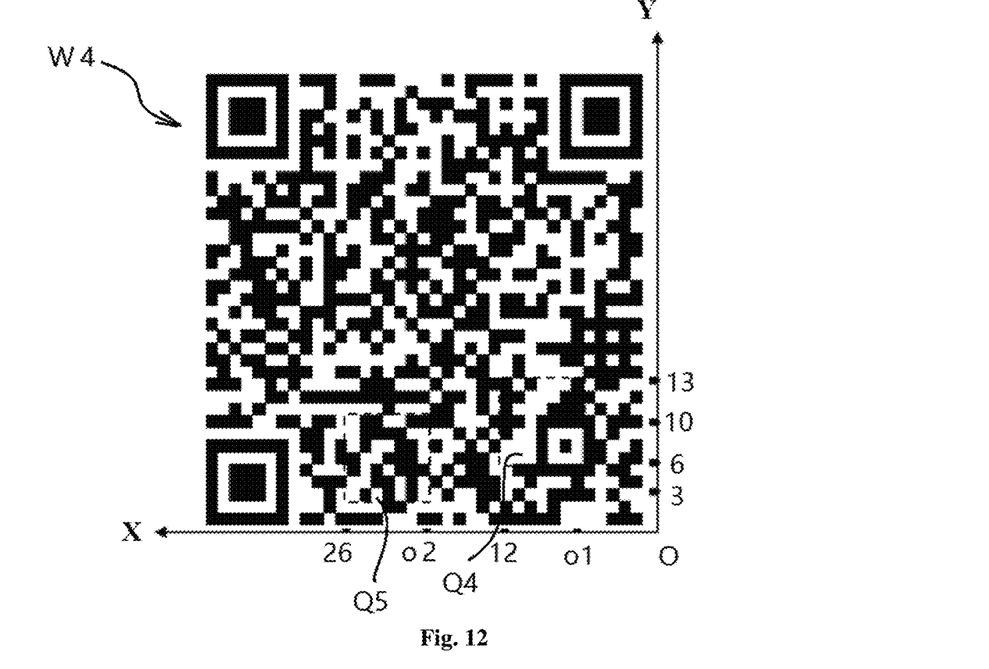
FIG. 12 is an example of enhancing security by increasing a recoding region.

FIG. 12 is a varied example of the recoding region. Two recoding regions Q4 and Q5 are provided in the two-dimensional code W4 in the varied example of FIG. 12; the recoding regions Q4 and Q5 are rectangular regions including 7*7 blocks; the reference position o1 of the recoding region Q4 is located at the coordinates (6, 6) position, and the reference position o2 of the recoding region Q5 is located at the coordinates (21, 3) position.

Varied Example 7

Figure 13:
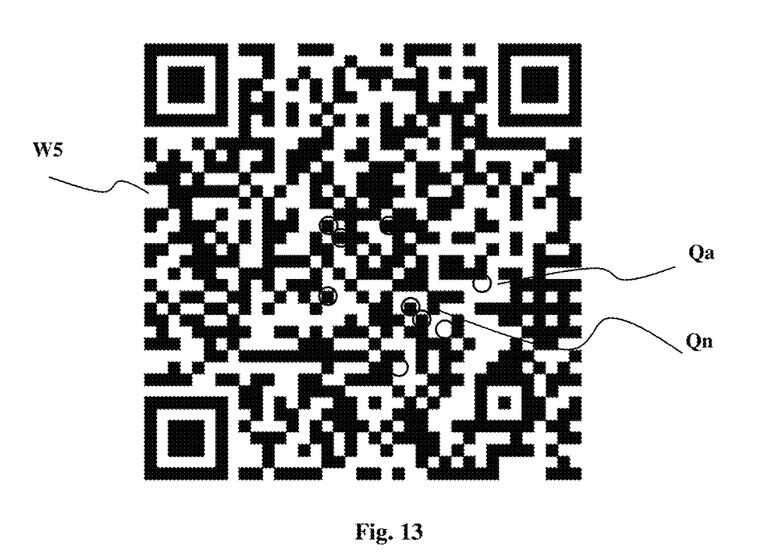
FIG. 13 is an example of using a minimum coding unit as the recoding region.

FIG. 13 is a varied example of the recoding region. In the varied example of FIG. 13, a plurality of recoding units (Qa . . . Qn) with 1*1 blocks are provided in the two-dimensional code W. FIG. 13 shows 10 recoding units, which could be more, e.g., 49. A combination of respective recoding units (Qa . . . Qn) forms a recoding region, i.e., the recoding region is scattered into a plurality of recoding units according to a certain rule, and the hidden information is dispersedly encoded into respective recoding units; upon reading, the recoding units are determined based on coordinate positions of respective recoding units, and then the recoding region is decoded after the respective recoding units have been arranged or restored into a recoding region of a certain shape according to a set rule. Because the recoding units are scattered at different positions of the two-dimensional code, it becomes more difficult to read the encoded hidden information. If a scattering rule of the recoding units is further encrypted, it becomes even more difficult to crack the recoding information generating algorithm, further enhancing security of the two-dimensional code.

What have been illustrated above are the generating apparatus, the reading apparatus, and corresponding generating and reading methods. It is difficult to copy the composite two-dimensional code generated as such; besides, the anti-counterfeiting function or the one-code multiple-purpose property may be further enhanced using its multiple sets of information.

Hereinafter, uses of the composite two-dimensional code will be illustrated via specific examples.

The composite two-dimensional code of FIG. 3 is an application in a registration management field. The website information http://www.big-code.cn is encoded in the two-dimensional code information; the two-dimensional code error correction level selects the highest H level; the number 123456 is encoded by recoding the 7*7 blocks of the rectangular region (recoding region Q), wherein the coding manner is like a coding manner of a conventional two-dimensional matrix code; besides, an error correction algorithm is added to guarantee a stable reading. The number 123456 represents the registration ID of the two-dimensional code, for managing the two-dimensional code. The two-dimensional code information is read using the user's universal reading software and linked to a website content. The specific reading software can only read, by positioning, the information of the coding region with 7*7 blocks; the registration ID is verified via Internet access or local query at the reading terminal; optionally, the two-dimensional code and the information in the coding region with the 7*7 blocks may be read, and then the registration ID is verified via Internet access or local query at the reading terminal. Optionally, the two-dimensional code information and the information of the coding region with 7*7 blocks may be read by a specific reading software; the reading terminal can only access the Internet via the website in the two-dimensional code when the information of the coding region with 7*7 blocks is verified to pass; otherwise, an error alert will be displayed, which guarantees the security of Internet access by code scanning.

FIG. 9 is an example of performing secure payment using a composite two-dimensional code.

In the composite two-dimensional code in FIG. 9, the two-dimensional code information is user account information: 1320 3234 4894 3928 23. The account information may be dynamically varied after being encrypted, and the dynamically varied two-dimensional code pattern is also a changing pattern. The two-dimensional code error correction level selects the highest H level as in FIG. 3; the rectangular region with 7*7 blocks at the right lower corner of the two-dimensional code is the recoding region Q1; when setting the recoding region Q1, it may be first tested that none of the various occlusions to the rectangular region affects reading of the two-dimensional code, i.e., the bit error rate of the two-dimensional code caused by the recoding region is lower than the error correction rate of the two-dimensional code. The 7*7 blocks of the recoding region Q1 are recoded, wherein the number 123123 is encoded with a manner similar to the coding method of a two-dimensional matrix code; besides, an error correction algorithm is added to guarantee a stable reading. The number 123123 corresponds to the key of the account information. The reading software determines to read, by positioning, the two-dimensional code and the information (key) of the recoding region with 7*7 blocks and accesses the Internet for verification. In the case of correct match, the flow goes to the payment procedure; otherwise, the payment will be rejected. This method enhances the payment security.

Hereinafter, an example of using the composite two-dimensional code for advertisement monitoring will be illustrated.

Illustration will be made with reference to the two-dimensional code of FIG. 2. The website information, http://www.big-code.cn, is encoded into the two-dimensional code of FIG. 2; the two-dimensional code error correction level selects the highest H level; the rectangular region with 7*7 blocks at the lower right corner of the two-dimensional code is selected as the recoding region Q. The 7*7 blocks of the rectangular region are recoded, wherein the number 456456 is encoded with a manner similar to the coding method of a two-dimensional matrix code; besides, an error correction algorithm is added to guarantee a stable reading. The number 456456 represents the parameter of the two-dimensional code, e.g., a media name, for identifying the source of the two-dimensional code scanned. The user's reading software (which also has a function of reading the information of the recoding region) reads the two-dimensional code and the information of the recoding region; the two-dimensional code information is linked to a website content; the information (456456) of the recoding region is imported into the background database via Internet access, available for monitoring, analyzing, and statistics, etc.

FIG. 10 is an example of applying the composite two-dimensional code to logistics plus marketing.

The website information, http://www.big-code.cn, is encoded into the two-dimensional code of FIG. 10; the two-dimensional code error correction level selects the highest H level; the rectangular region with 7*14 blocks at the lower right corner of the two-dimensional code is selected as the recoding region Q2. The 7*14 blocks of the rectangular region are recoded; the number 1234567890 is encoded in a manner similar to the coding manner of a two-dimensional matrix code; besides, an error correction algorithm is added to guarantee a stable reading. The number 1234567890 represents a logistic code. When printing, the two-dimensional code coding information does not change, while the code information of the region with 7*14 blocks changes, which represents the logistic code. The user uses a universal reading software to read the two-dimensional code information which is linked to the website content; the specific reading software reads, by positioning, the information (logistic code 1234567890) of the coding region with 7*14 blocks; the information is imported into the background database via networking, available for logistic monitoring, statistics, analysis, etc.

FIG. 11 is an example of applying the composite two-dimensional code to fidelity of the two-dimensional code information.

"Beijing Rocket Technology Co., Ltd., Uniform Social Credit Code 81210108MA003JQGOW, 201435" is encoded in the two-dimensional code W3 in FIG. 11; the two-dimensional code error correction level selects a medium M level. The tail "201435" of the two-dimensional code coding information refers to the position control information of the recoding region with 7*14 blocks, as shown in the figure. The position control information may be encrypted; after the position control information is decrypted by the reading terminal, the position of the recoding region with 7*14 blocks is calculated through an algorithm, i.e., the coordinates (12, 4) of the reference point o in the recoding region Q3, the 12# block on the X axis and the 4# block on the Y axis. Then, the reading terminal decodes the coding information of the 7*14 region. The information may be a password or a key; authenticity of the information in the two-dimensional code may be confirmed via Internet access or local operation (e.g., digest operation) at the decoding terminal. This varied example adopts a method of dynamic position plus pattern encryption, causing the algorithm for generating the information of the recoding region more difficult to crack, thereby enhancing the security.

FIG. 12 is an example of enhancing security by adding a recoding region.

"Beijing Rocket Technology Co., Ltd., Uniform Social Credit Code 81210108MA003JQGOW, 201435" is encoded in the two-dimensional code in FIG. 12; the two-dimensional code error correction level selects a medium M level. The "201" in the tail "201435" of the two-dimensional coding information refers to position control information of the 7*7 block #1; "435" refers to the position control information of the 7*7 block #2; wherein the positions of the 7*7 block #1 and the 7*7 block #2 are shown in the figure. Different coding rules or a same coding rule may be applied to the two recoding regions. The reading terminal decodes the coding information of the 7*7 block #1 region and the 7*7 block #2 region. A combination of the two pieces of information may be a password or a key; the authenticity of the information in the two-dimensional code may be confirmed via Internet access or local operation (e.g., digest operation) at the decoding terminal. This varied example adopts a method of multiple recoding regions, such that the algorithm for generating the information of the recoding regions is more difficult to crack, thereby enhancing the security.

In all of the embodiments above, one or more recoding regions are set, and hidden information (e.g., key, logistic management information) is encoded into the recoding region. However, the recoding region may also be scattered in the two-dimensional code pattern based on minimum coding units (blocks), as long as the resulting overall bit error rate is lower than the error correction rate.

FIG. 13 is an example of encoding hidden information into the minimum recoding unit.

"Beijing Rocket Technology Co., Ltd., Uniform Social Credit Code 81210108MA003JQGOW, 201435" is encoded in the two-dimensional code W5 in FIG. 13; the two-dimensional code error correction level selects a medium M level. A plurality of recoding units (Qa . . . Qn) with 1*1 blocks are provided in the two-dimensional code. FIG. 13 shows 10 recoding units, which could be more, e.g., 49. The "201435" at the tail of the two-dimensional code coding information refers to position distribution data or a position distribution rule of these recoding units, e.g., according to the coordinates, or according to a distribution rule of a certain algorithm; the distribution rule data of the "201435" may also be combined with or operated with another data "23812945" in the reading terminal, thereby obtaining the distribution rule data of respective recoding units. The reading terminal decodes these minimum recoding units with 1*1 blocks according to the distribution rule data. For example, supposing there are 49 minimum recoding units in total, according to the distribution rule data, a recoding region with 7*7 blocks is restored, and then only the 7*7 blocks are decoded. The decoded information may be a password or a key; the authenticity of the information in the two-dimensional code may be confirmed via Internet access or local operation (e.g., digest operation) at the decoding terminal. This scheme adopts a method with multiple recoding units, causing the generation algorithm of the hidden information more difficult to be cracked by first encrypting the position of the recoding region and then encoding the information, which further enhances security of the two-dimensional code.

We claim:

1. An apparatus for generating a composite two-dimensional code, comprising: a two-dimensional code encoding module (1), a two-dimensional code pattern generating module (2), a hidden information encoding module (3), a recoding region setting module (5), and a pattern compositing module (6); wherein the two-dimensional code encoding module (1) is configured for generating two-dimensional code coding information based on two-dimensional code information;

the two-dimensional code pattern generating module (2) is configured for generating a two-dimensional code pattern (W) based on the two-dimensional code coding information;

the hidden information encoding module (3) is configured for generating recoding information based on hidden information;

the recoding region setting module (5) is configured for setting a recoding region (Q) for encoding the hidden information into the two-dimensional code pattern (W), so as to generate setting information associated with a shape of the recoding region, the number of blocks in the regions, and a reference position, and the pattern compositing module (6) is configured for determining the recoding region (Q) in the two-dimensional code pattern (W) based on the setting information, adjusting a block distribution of the recoding region (Q) in the two-dimensional code pattern (W) based on the recoding information, so as to encode the hidden information into the two-dimensional code pattern, thereby generating the composite two-dimensional code.

2. The apparatus for generating a composite two-dimensional code according to claim 1, further comprising: an output module (7) configured for verifying, before outputting the composite two-dimensional code, whether a bit error rate of the two-dimensional code is lower than an error correction rate or there remains an error correction margin.

3. The apparatus for generating a composite two-dimensional code according to claim 2, further comprising: a mask processing module (8) configured for performing mask processing, after the pattern compositing module (6) encodes the hidden information into the two-dimensional code pattern, to thereby generate the composite two-dimensional code.

4. The apparatus for generating a composite two-dimensional code according to claim 2, wherein the hidden information encoding module (3) adds an error correction codeword when generating recoding information such that the hidden information has an error correction function.

5. The apparatus for generating a composite two-dimensional code according to claim 1, wherein the recoding region setting module (5) sets a plurality of recoding regions.

6. The apparatus for generating a composite two-dimensional code according to claim 5, wherein when generating the two-dimensional code coding information, the two-dimensional code encoding module (1) combines the two-dimensional code information with setting information of the recoding region into combined information, and then generates the two-dimensional code coding information based on the combined information.

7. The apparatus for generating a composite two-dimensional code according to claim 6, further comprising a hidden information pattern generating module (4) which is configured for generating a hidden information coding pattern based on a shape of the recoding region and the number of blocks included in the recoding region, wherein a block distribution in the hidden information coding pattern corresponds to the recoding information.

8. A method for generating a composite two-dimensional code, comprising steps of:

Step 1 (S2): generating two-dimensional code coding information based on two-dimensional code information;

Step 2 (S3): generating a two-dimensional code pattern (W) based on the two-dimensional code coding information;

Step 3 (S4): setting a recoding region (Q) in the generated two-dimensional code pattern (W), generating setting information, which comprises a shape of the recoding region, the number of blocks, and position coordinates of the recoding region;

Step 4 (S5): generating recoding information based on hidden information; and

Step 6 (S7): adjusting distribution of dark-colored blocks and light-colored blocks in the recoding region (Q) based on the recoding information, so as to encode the hidden information into the two-dimensional code, thereby generating the composite two-dimensional code.

9. The method for generating a composite two-dimensional code according to claim 8, further comprising: step 7 (S8): verifying whether a bit error rate of the composite two-dimensional code is lower than an error correction rate; and if the bit error rate is greater than the error correction rate, resetting an error correction level of the two-dimensional code or repositioning, or adjusting, the size shape of the recoding region (Q).

10. The method for generating a composite two-dimensional code according to claim 9, further comprising:

substituting step 6a for the step 6 (S7), wherein in the step 6a, code elements in the recoding information are sequentially read and compared with numerical values of corresponding blocks in the recoding region; performing anti-color processing to an inconsistent block; encoding the hidden information into the two-dimensional code; and generating the composite two-dimensional code.

11. The method for generating a composite two-dimensional code according to claim 10, wherein:

in the step 4 (S5), when generating the recoding information, an error correction codeword is added, such that the hidden information has an error correction function.

12. The method for generating a composite two-dimensional code according to claim 8, wherein in Step 3 (S4), a plurality of recoding regions (Q) are set in the generated two-dimensional code pattern (W).

13. The method for generating a composite two-dimensional code according to claim 8, wherein in the step 1(S2), when generating the two-dimensional code coding information, the two-dimensional code information is combined with setting information of the recoding region into combined information, and then the two-dimensional code coding information is generated based on the combined information.

* * * * *